W. STANLEY.
ELECTRIC HEATER.
APPLICATION FILED SEPT. 7, 1912.
1,060,718.
Patented May 6, 1913.
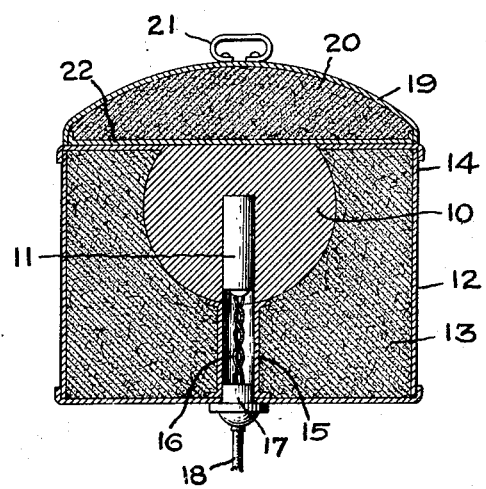
WITNESSES:
Margaret E. Woolley
Helena M. Godfrey
INVENTOR:
WILLIAM STANLEY,
BY Albert G. Davis
HIS ATTORNEY.

UNITED STATES PATENT OFFICE.

WILLIAM STANLEY, OF GREAT BARRINGTON, MASSACHUSETTS, ASSIGNOR TO GENERAL ELECTRIC COMPANY, A CORPORATION OF NEW YORK.

ELECTRIC HEATER.

1,060,718.   Specification of Letters Patent.   Patented May 6, 1913.

Application filed September 7, 1912. Serial No. 719,219.

*To all whom it may concern:*

Be it known that I, WILLIAM STANLEY, a citizen of the United States, residing at Great Barrington, county of Berkshire, State of Massachusetts, have invented certain new and useful Improvements in Electric Heaters, of which the following is a specification.

My invention relates to heat storage stoves of the general character disclosed in my Patent No. 1,025,843, and in my application, Serial No. 693,965. In heat storage stoves of this character, heat is stored electrically in a mass of material which has high heat storage capacity. Such storage may be at a low rate and may occur during periods when the load on the central station is otherwise low. In connection with the said devices provision is made for conducting the heat from the storage mass, when desired, to an external body, and in order that the apparatus may be efficient for cooking and like operations, provision is made for a rapid flow of the said heat. This result is secured by providing a path of high thermal conductivity from the heat storage mass to the body to be heated. In the devices specifically disclosed in my application and patent hereinbefore referred to, this path is provided by means of a "thermal switch" which comprises an element which is interposed between the storage mass or a portion thereof and the body to be heated.

The object of the present invention is to render the storage mass accessible for cooking or other operations without the interposition of an auxiliary element and at the same time to effectively insulate it against heat losses.

According to my invention I utilize a heat storage mass composed of material such as iron having high heat storage capacity and high thermal conductivity and surround such storage mass with heat insulation which may be powdered silica, infusorial earth or other suitable material. The construction is such that a portion of the heat insulation is removable to expose a portion of the surface of the heat storage mass. In order that the surface so exposed shall be easily accessible and that various sizes of cooking utensils, etc., may be placed in contact therewith, it is located substantially flush with or beyond the adjacent surfaces of the stove. Preferably it is substantially flush therewith because of the better heat insulation thus secured. The said surface is of such contour as to contact intimately with cooking utensils or other bodies which may be placed thereon. The said surface is also of such dimensions and is so connected with all portions of the heat storage mass that sufficient heat will be conducted therethrough for cooking and like operations. By reason of this structure the apparatus may be very conveniently utilized for the cooking or other operation since it merely requires the removal of a light cover and the placing of the cooking utensil or other body in contact with the exposed portion of the heat storage mass. By reason of the fact that the heat storage mass possesses not only high heat storage capacity, but also high heat conductivity the transfer of heat from all portions thereof is very rapid.

My invention will be more clearly understood by a reference to the accompanying drawing and to the following description. In the said drawing is shown a vertical section of a stove embodying my invention.

The stove shown in the drawing comprises a stationary or body portion containing the heat storage mass 10 which may be of any desired shape. Preferably, as shown in the drawing, it is a sphere having its top portion flattened. The top surface should be of such dimensions that sufficient heat will be conducted therethrough for cooking and like operations. Owing to the shape of the heat storage mass the aforesaid surface is in good thermal conductive relation with all portions of the same. The said storage mass is composed of iron or other material having high heat storage capacity and high thermal conductivity. Within the storage mass is inserted the electrical resistance unit 11 which may be of any of the well-known types, such as the cartridge type disclosed in Vogel Patent No. 839,343. The heat storage mass is contained within a casing 12, preferably of metal. Heat insulating material 13 such as powdered silica, infusorial earth or other suitable heat insulation may be packed between the casing and the storage mass. That portion 14 of the casing constituting the top of the body portion of the stove and which extends between the heat storage mass and the side walls of the casing is preferably composed of metal, such as that disclosed in Dempster Patent No. 901,428, having high thermal resistance. The conduit 15 through which the conductors 16 extend to the electric heat unit 11 is preferably also composed of that metal. A plug 17 may be inserted in the end of the said conduit to afford connection between the conductors 16 and the conductors 18 leading to an external source of electric current. The top surface of the heat storage mass 10 is substantially flush with the top of the body portion of the stove. The cover for the stove is removable and comprises the metal shell 19 which may be filled with heat insulation 20. The cover may have a suitable handle 21. The bottom 22 of the cover is preferably composed of high resistance metal.

By means of the electric heat unit 11, heat may be supplied at such times and at such rates as are consistent with efficiency and economy. Loss of heat by radiation and conduction is prevented by means of the heat insulation and by reason of the fact that the metal parts which contact with the heat storage mass have high thermal resistance. When it is desired to utilize the stove for cooking or other operation the cover may be readily removed thus exposing the flat surface of the heat storage mass and the cooking utensil or other articles may be placed upon the same. Owing to the high thermal conductivity of the heat storage mass, a path of high thermal conductivity is provided leading to the body to be heated, and heat is supplied at a very high rate.

Various modifications of the above apparatus may be made without departing from the spirit of my invention, the scope of which is set forth in the following claims.

What I claim as new and desire to secure by Letters Patent of the United States, is:—

1. In a heat storage stove, a body portion comprising a heat insulating casing and a stationary heat storage mass having high thermal conductivity contained within said casing and having a portion thereof extending so that its end surface is at least substantially flush with one face of said casing and a removable cover adapted to be placed over the end surface of the said portion of the heat storage mass.

2. In a heat storage stove, a storage mass having high thermal conductivity, heat insulation normally surrounding said heat storage mass, a portion of said heat insulation being removable to expose a surface of the said heat storage mass, said surface being substantially flush with the surrounding insulation and in good thermal conductive relation with all portions of the heat storage mass.

3. In a heat storage stove, a body portion comprising a heat storage mass having high thermal conductivity and heat insulation located around the same but leaving the top thereof exposed, said top of the heat storage mass being substantially flush with the top of the body portion of the stove, and a removable cover for the said body portion.

In witness whereof, I have hereunto set my hand this third day of September, 1912.

WILLIAM STANLEY.

Witnesses:
 WILLIAM W. STANLEY,
 F. G. LARAMEE.

---

Copies of this patent may be obtained for five cents each, by addressing the "Commissioner of Patents Washington, D. C."